(12) United States Patent
Woerner et al.

(10) Patent No.: US 7,247,665 B1
(45) Date of Patent: Jul. 24, 2007

(54) POLYOXYMETHYLENE WITH IMPROVED RESISTANCE TO ACIDS AND ITS USE

(75) Inventors: Carsten Woerner, Breuberg (DE); Ursula Ziegler, Mainz (DE); Kurt Witan, Hofheim (DE); Klaus Kurz, Kelsterbach (DE)

(73) Assignee: Ticona GmbH, Kelsterbach (DE)

( * ) Notice: Subject to any disclaimer, the term of this patent is extended or adjusted under 35 U.S.C. 154(b) by 474 days.

(21) Appl. No.: 10/088,656

(22) PCT Filed: Sep. 1, 2000

(86) PCT No.: PCT/EP00/08539

§ 371 (c)(1),
(2), (4) Date: Jun. 13, 2002

(87) PCT Pub. No.: WO01/18114

PCT Pub. Date: Mar. 15, 2001

(30) Foreign Application Priority Data

Sep. 9, 1999 (DE) ................. 199 43 178

(51) Int. Cl.
*C08K 5/3432* (2006.01)
*C08K 3/20* (2006.01)
*C08K 5/053* (2006.01)

(52) U.S. Cl. .............. 524/100; 524/378; 524/432; 524/542; 524/593

(58) Field of Classification Search ........ 524/432, 524/542, 378, 593, 100, 237
See application file for complete search history.

(56) References Cited

U.S. PATENT DOCUMENTS

| | | | | |
|---|---|---|---|---|
| 4,493,751 A | | 1/1985 | Cherdron et al. | 162/157.2 |
| 4,517,319 A | * | 5/1985 | Reske et al. | 523/200 |
| 4,526,921 A | * | 7/1985 | Sakurai et al. | 524/405 |
| 4,780,498 A | * | 10/1988 | Goerrissen et al. | 524/456 |
| 5,393,813 A | | 2/1995 | Schauhoff et al. | 524/101 |
| 5,478,895 A | * | 12/1995 | Sugiyama et al. | 525/398 |
| 5,693,709 A | | 12/1997 | Nun et al. | 524/593 |
| 5,889,102 A | | 3/1999 | Haack et al. | |
| 6,147,146 A | * | 11/2000 | Horio et al. | 524/100 |
| 6,284,828 B1 | * | 9/2001 | Takayama | 524/413 |
| 6,391,956 B1 | * | 5/2002 | Horio et al. | 524/314 |
| 6,489,388 B1 | * | 12/2002 | Kurz et al. | 524/432 |

FOREIGN PATENT DOCUMENTS

| | | |
|---|---|---|
| DE | 29 47 490 | 11/1979 |
| DE | 44 42 723 | 12/1994 |
| DE | 196 06 948 | 8/1997 |
| DE | 199 25 491 | 12/2000 |
| EP | 0 595 137 | 10/1993 |
| EP | 0 595 139 | 10/1993 |
| EP | 1 057 868 | 5/2000 |
| JP | 228751 | 8/1995 |
| WO | WO 93/13166 | 7/1993 |

* cited by examiner

*Primary Examiner*—Tae H Yoon
(74) *Attorney, Agent, or Firm*—Connolly Bove Lodge & Hutz LLP

(57) ABSTRACT

Polyoxymethylene with improved resistance to acids, comprising
- A from 84 to 99.79% by weight of at least one polyoxymethylene homo- or copolymer,
- B from 0.1 to 5% by weight of at least one polyalkylene glycol,
- C from 0.1 to 10% by weight of zinc oxide, and
- D from 0.01 to 1% by weight of one or more nitrogen-containing costabilizers, where the total of the percentages by weight of components A to D is 100%.

This polyoxymethylene is particularly advantageous when used for producing moldings for use in contact with aggressive acids or with aggressive acid-containing cleaning agents, in particular for applications in the sanitary sector or the white goods sector.

17 Claims, No Drawings

POLYOXYMETHYLENE WITH IMPROVED RESISTANCE TO ACIDS AND ITS USE

This application is a 371 national phase application of PCT/EP00/08539, filed on Sep. 1, 2000, claiming priority to German Application No. 19943178.7, filed on Sep. 9, 1999.

The invention relates to polyoxymethylene molding compositions and polyoxymethylene moldings, both with improved resistance to acids, particularly to aggressive acid-containing cleaners, and also to their use, particularly in the sanitary sector or the white goods sector. In particular, it has been found that the acid resistance of polyoxymethylene can be increased without impairing its mechanical properties if zinc oxide is present in the polyoxymethylene molding composition, in addition to polyalkylene glycol and nitrogen-containing costabilizers. The invention further relates to the production of moldings which are used in contact with aggressive acid-containing cleaners, for example in the sanitary sector or the white goods sector.

Due to their excellent mechanical properties and their good chemicals resistance, polyoxymethylenes (POMs, polyacetyls) have been used for many years, inter alia for many applications in the sanitary sector or white goods sector. The particular factors which predestine this material for these areas of application are very good hydrolysis resistance, high dimensional stability, a balanced ratio or stiffness to toughness and excellent environmental-stress-cracking resistance.

However, cleaners used in households and on buildings have for some time tended to adopt more aggressive acid-containing formulations for faster action. In particular if these cleaners cannot be adequately removed by rinsing, drying and concentration can cause high concentrations of acid to occur on the surface of moldings, functional parts or other components (hereinafter grouped under the terms moldings or products), and these concentrations can cause acidolytic corrosion.

There have been many different descriptions of methods for improving the acid resistance of polyoxymethylenes. An example of a customary method is the incorporation of acid-resistant end groups and of comonomers to stabilize the polyacetyl chains in the POM polymer matrix (Becker/Braun, Kunststoffhandbuch [Plastics Handbook] vol. 3/1, Hanser Verlag 1992, p. 300 et seq.). Stabilization of this type is by no means adequate for the acid resistance requirements described, since acid-catalyzed hydrolytic decomposition of POM can take place at any point within the polymer, and the protection given by stabilized end groups or comonomer units is therefore incomplete.

Another known method is to add low concentrations of proton acceptors such as alkaline earth metal salts of carboxylic acids, alkaline earth metal oxides or alkaline earth metal hydroxides, amines or other nitrogen-containing compounds (Becker/Braun, Kunststoffhandbuch [Plastics Handbook] vol. 3/1, Hanser Verlag 1992, p. 300 et seq., and Gätchter/Müller, Kunststoffadditive [Plastics Additives], 3rd edition, Hanser Verlag 1990, p. 94 et seq.). This is also inadequate for the abovementioned increased requirements placed upon the acid resistance of polyoxymethylene. Since these components are basic in nature, adding higher concentrations merely causes severe discoloration of the POM matrix, but does not give the acid resistance desired.

EP-A 595 139 and EP-A 595 137 describe mixtures which give acid resistance, made from melamine cyanurate, alkali metal salts of polybasic acids, polyalkylene glycol and thermoplastic polyurethane (TPU). These stabilizing additives have a disadvantageous effect on the polyoxymethylene by way of discoloration, e.g. produced by alkali metal salts, and also by way of the fall in stiffness when TPU is added within the hardness range stated.

DE-A 44 42 723 describes the addition of carbodiimides to give acid resistance to polyoxymethylenes. However, it has been found that the resultant improvement in acid resistance is inadequate for long-term use in contact with highly aggressive acid-containing cleaners.

It was therefore an object of the present invention to find a polyoxymethylene molding composition which permits products produced therefrom to meet the increased requirements for resistance to acids, in particular to aggressive acid-containing cleaners, while at the same time retaining the excellent mechanical properties of the polyoxymethylene.

The present invention opens up a new way of achieving a marked improvement in acid resistance, while at the same time retaining the mechanical properties of the polyacetals. The additives used for this comprise polyalkylene glycol, nitrogen-containing costabilizers and zinc oxide.

The invention therefore provides a polyoxymethylene with improved resistance to acids, comprising (A) from 84 to 99.79% by weight of at least one polyoxymethylene homo- or copolymer,
(B) from 0.1 to 5% by weight of at least one polyalkylene glycol,
(C) from 0.1 to 10% by weight of a zinc oxide, and
(D) from 0.01 to 1% by weight of one or more nitrogen-containing costabilizers, where the total of the percentages by weight of components (A) to (D) is always 100%.

The invention also correspondingly provides the use of
(B) from 0.1 to 5% by weight of at least one polyalkylene glycol,
(C) from 0.1 to 10% by weight of zinc oxide, and
(D) from 0.01 to 1% by weight of one or more nitrogen-containing costabilizers, with from 84 to 99.79% by weight of at least one polyoxymethylene homo- or copolymer (A), where the total of the percentages by weight of components (A) to (D) is 100%, for improving the acid resistance of the polyoxymethylene homo- or copolymer, or of moldings produced therefrom.

The invention further provides the use of the novel polyoxymethylene for producing moldings for applications in direct contact with aggressive acids, in particular with aggressive acid-containing cleaners.

Surprisingly, it has been found that adding polyalkylene glycol, nitrogen-containing costabilizers and zinc oxide in the proportions mentioned markedly reduces the weight loss from polyoxymethylene moldings in acid/surfactant mixtures, and at the same time retention of mechanical properties can be markedly improved. If, however, the amounts of components B–D added is below the ranges mentioned, the resistance achieved is insufficient, while addition of excessive amounts affects the mechanical properties of the resultant moldings.

The base polymers (component A) used by the invention comprise the known polyoxymethylenes, as described in DE-A 2 947 490, for example. These are essentially unbranched linear polymers, which generally contain at least 80 mol %, preferably at least 90 mol %, of oxymethylene units ($-CH_2O-$). The term polyoxymethylenes here includes both homopolymers of formaldehyde or of its cyclic oligomers, such as trioxane or tetroxane, and also corresponding copolymers.

Homopolymers of formaldehyde or of trioxane are polymers of this type whose hydroxyl end groups have been chemically stabilized in a known manner, to resist degradation, e.g. by esterification or etherification. Copolymers are polymers made from formaldehyde or from its cyclic oligomers, in particular trioxane, and from cyclic ethers, cyclic acetals and/or linear polyacetals.

Comonomers which may be used are especially cyclic ethers having 3, 4 or 5, preferably 3, ring members, cyclic acetals other than trioxane, having from 5 to 11 ring members, preferably 5, 6, 7 or 8 ring members, and linear polyacetals. The proportion of the cocomponents in the polymer is generally from 0.1 to 20 mol %, preferably from 0.5 to 10 mol %. The most suitable copolymers are those made from 95–99.5 mol % of trioxane and 0.5–5 mol % of one of the abovementioned cocomponents.

The proportion of the polyoxymethylene in the novel mixture is preferably from 94 to 99% by weight.

The polyalkylene glycol (component B) preferably has an average molecular weight of from 1000 to 45,000, in particular from 5000 to 40,000. Its proportion in the mixture is preferably from 0.5 to 5% by weight, particularly preferably from 1 to 3% by weight. Preferred polyalkylene glycols are polyethylene glycol and polypropylene glycol, particularly preferably polyethylene glycol.

The proportion of the zinc oxide (component C) in the mixture is preferably from 0.5 to 5% by weight and particularly preferably from 0.5 to 3% by weight.

The nitrogen-containing costabilizers (component D) are selected from the group consisting of those amino costabilizers, amide costabilizers, hydrazine costabilizers and urea costabilizers which are customary for polyacetals. These may be used individually or else in combination with one another. Hindered amines may also be used. However, particular preference is given to melamine. The proportion of the nitrogen-containing costabilizers is preferably from 0.03 to 0.3% by weight.

The novel mixture may comprise the required amounts of other additives, such as anitoxidants, in particular hindered phenolic compounds, customary basic costabilizers, such as alkaline earth metal salts of carboxylic acids, alkali metal oxides or alkali metal hydroxides, nucleating agents, antistats, light stabilizers, lubricants, plasticizers, pigments, dyes, optical brighteners, processing aids and the like. It is not advisable to add alkali metal salts of carboxylic acids, for the reasons mentioned above.

The total amounts usually used of the additives are from 0.1 to 5% by weight, in particular from 0.5 to 3% by weight, based on the entire molding composition. However, the amounts required may also differ from these, depending on the nature and makeup of the material.

The novel mixture may also comprise well known polymeric additives. To improve impact strength or sliding/friction properties it may comprise thermoplastic polyurethane elastomers, grafted polybutadiene core-shell modifiers, grafted acrylate core-shell modifiers, polytetrafluoroethylene, polyethylene, ultrahigh-molecular-weight polyethylene or grafted polyethylene, for example. The total amount of these polymeric additives is usually up to 40% by weight, preferably up to 30% by weight, based on the entire mixture.

The novel mixture may moreover also comprise fillers and reinforcing materials. These may, for example, be fibrous reinforcing materials, such as glass fibers, carbon fibers, etc., or else nonfibrous fillers, such as powdered glass, graphite, carbon black, metal powders, metal oxides, silicates, carbonates or molybdenum(IV) sulfide. These fillers may have been provided with a coupling agent or coupling agent system. The total amount of fillers and/or reinforcing materials is usually up to 50% by weight, preferably up to 40% by weight, based on the entire mixture.

The novel mixtures may be prepared by customary and known processes, for example by intensive mixing of the constituents at an elevated temperature, i.e. generally at temperatures above the melting point of component A, that is to say at from about 160 to 250° C., preferably from 180 to 220° C., in assemblies which give good mixing, such as kneaders or extruders, advantageously in twin-screw extruders. It is usual for the pulverulent components first to be mixed mechanically at room temperature and then melted for complete homogenization.

When additives, fillers or reinforcing materials are used it may, however, also be advantageous to use masterbatches or concentrates of these. Fibrous materials may also be introduced in continuous form, for example, into the mixing assembly, in particular into the extruder.

The novel polyoxymethylene has a balanced property profile. Moldings produced therefrom are particularly suitable for use in contact with aggressive acids and with aggressive acid-containing cleaners. In comparison with POM molding compositions which comprise none, or only one, of the components (B) to (D), the novel molding compositions give less chemical degradation and also less loss of mechanical properties, in particular after contact with aggressive acid-containing cleaners.

Possible fields of application include in particular fittings, flow modifiers, ventilation valves and functional parts of dishwashers, these being mainly produced from engineering plastics. The plastic components here come directly or indirectly via what is known as capillary action into contact with the aggressive media, and, depending on the ambient conditions, can be damaged relatively rapidly, with lasting impairment of their function.

Examples of these fittings are mixing cartridges in mixers (faucets) with single-handed lever operation, as mostly used nowadays in bathrooms or toilets. These cylindrical components permit precise setting of water temperature by regulating the flow of cold or warm water.

Flow modifiers are very finely structured flow formers which in modern water faucets and showerheads ensure that the stream of water emerging incorporates sufficient air to give it a foam-like consistency and prevent splashing. The flow modifier is generally the final component in the drinking water chain.

Ventilation valves are used in closed water-circulation systems, to remove volumes of air from the pipeline system as required. Particularly in systems using chlorinated water, the plastics used here have to have long-term resistance.

Examples of the functional parts for dishwashers are retaining nuts for fixing the rotating spray arms, screening systems, such as the rinse-aid screen, outflow screen, etc., or wash-basket rollers, which ensure that the movability of these inserts is retained under load.

EXAMPLES

The following components were used for the inventive Examples 5 and 8, and also for the Comparative Examples 1 to 4, 6 and 7:

Component A

Polyoxymethylene copolymer made from 96.6% by weight of trioxane and 3.4% by weight of dioxolane, stabilized with 0.3% of phenolic antioxidant and 0.2% by weight of tricalcium citrate. The melt volume rate was 8.0 cm³/10 min (190° C., 2.16 kg applied weight to ISO 1133).

Component B

Polyethylene glycol 12000 P from Clariant GmbH; polyethylene glycol with an average molecular weight of 12,000.

Component C: Zinkoxyd aktiv® from Bayer AG.

Component D1: Melamine, pure industrial grade.

difference relative to the initial weight was determined. The aged specimens were then used for a tensile test to ISO 527 with an extension rate of 12.5 mm/min.

Table 1 gives the makeup of the materials with the corresponding test results for immersion experiments in a solution made from 10% by weight of phosphoric acid and 1% by weight of Mersolat H 40®.

TABLE 1

|  | Comparative Example 1 | Comparative Example 2 | Comparative Example 3 | Comparative Example 4 | Example 5 |
|---|---|---|---|---|---|
| Component A [% by weight] | 100 | 99.8 | 97.8 | 97.0 | 96.9 |
| Component B [% by weight] | — | — | 2.0 | 2.0 | 2.0 |
| Component C [% by weight] | — | — | — | — | 1.0 |
| Component D1 [% by weight] | — | 0.2 | 0.2 | — | 0.1 |
| Component D2 [% by weight] | — | — | — | 1.0 | — |
| Rel. weight difference [%] | −41.3 | −28.4 | −15.9 | −17.1 | −13.1 |
| Elongation at break prior to aging [%] | 72.9 | 69.4 | 70.4 | 46.3 | 72.7 |
| Elongation at break after immersion experiment [%] | 4.3 | 7.0 | 32.2 | 23.2 | 48.3 |

Component D2: Melamine cyanurate, pure industrial grade.

Component D3: Tinuvin 770® hindered amine from Ciba Specialty Chemicals.

The POM component (A) was mixed with the appropriate parts by weight of components (B)–(D) as in Tables 1 and 2, and melted in a ZE 25×33 D twin-screw extruder (Berstorff, Hanover, Germany) at a melt temperature of 200° C., and then pelletized.

The pellets were dried for 16 hours at 80° C. and then injection molded to give ISO ¼ tensile specimens (in the earlier ISO 527) as test specimens for the resistance tests and mechanical tests. The processing conditions were selected in accordance with the recommendations in ISO 9988-2, the materials standard for POM. The use of ISO ¼ tensile specimens, which have a thickness of only 1 mm, rather than the type 1A tensile specimen (ISO 527-1,2) which has a thickness of 4 mm, is based on the fact that smaller specimens are markedly more effective for measuring material degradation and mechanical properties.

Aging and Tests:

Prior to aging, five test specimens were weighed on each occasion for initial weight determination. Five other test specimens were tested as control specimens for determination of initial mechanical properties in the ISO 527 tensile test with an extension rate of 12.5 mm/min.

The weighed test specimens were freely suspended and completely immersed in an aqueous solution made from 10% by weight of phosphoric acid and 1% by weight of Mersolat H 40® (ionic surfactant from Bayer AG) in the case of Examples 1 to 5 and, respectively, 10% by weight of amidosulfonic acid and 1% by weight of Mersolat H 40® in the case of Examples 6 to 8. After about 20 seconds, the specimens were removed and, without wiping off adherent acid/surfactant solution, aged freely suspended for 24 hours in conditions of controlled temperature and humidity at 23° C. and a relative humidity of about 30%. After these 24 hours, the same test specimens were again dipped for about 20 seconds in the acid/surfactant solution and then aged for 24 hours, again as described, without wiping off the solution. This immersion cycle was carried out on a total of five successive days. Following this, the specimens treated in this way were aged for a further 9 days suspended in the environment with controlled temperature and humidity. After this period of exposure to the increased-concentration acid/surfactant solution, 14 days in total, the five specimens were carefully wiped clean and reweighed. The weight Adding components B, C and D within the given range of concentration significantly reduces degradation of the material. The best results, with the lowest possible loss of elongation at break and with little degradation of the material, are achieved with a combination according to the invention of components B, C and D1.

For the immersion experiment conditions selected, the change in weight is reduced to about ⅓ of the initial value (for 100% by weight of A), and the relative loss of elongation at break brought about by the immersion experiment is reduced from above 90% to about 30%. In the inventive Example 5, there is virtually no change between the initial elongation and that of the unmodified material (Comparative Example 1).

Table 2 gives the makeup of the materials with the corresponding test results for immersion experiments in a solution made from 10% by weight of amidosulfonic acid and 1% by weight of Mersolat H 40®.

TABLE 2

|  | Comparative Example 6 | Comparative Example 7 | Example 8 |
|---|---|---|---|
| Component A [% by weight] | 100 | 98.7 | 96.9 |
| Component B [% by weight] | — | 1.0 | 2.0 |
| Component C [% by weight] | — | — | 1.0 |
| Component D1 [% by weight] | — | 0.1 | 0.1 |
| Component D3 [% by weight] | — | 0.2 | — |
| Rel. weight difference [%] | −33.7 | −19.6 | −14.4 |
| Elongation at break prior to aging [%] | 72.9 | 85.4 | 72.7 |
| Elongation at break after immersion experiment [%] | 0.1 | 4.6 | 20.7 |

Adding components B, C and D within the given range of concentration significantly reduces degradation of the material. The best results, with the lowest possible loss of elongation at break and with little degradation of the material, are achieved with a combination according to the invention of components B, C and D1.

For the immersion experiment conditions selected, the change in weight is reduced to less than half of the initial value (for 100% by weight of A), and the virtually complete loss of elongation at break brought about by the immersion experiment is markedly reduced. In the inventive Example 8, there is virtually no change between the initial elongation and that of the unmodified material (Comparative Example 6).

The invention claimed is:

1. A polyoxymethylene composition comprising
   A from 84 to 99.79% by weight of at least one polyoxymethylene homo- or copolymer,
   B from 0.1 to 5% by weight of at least one polyalkylene glycol,
   C from 0.1 to 10% by weight of zinc oxide, and
   D from 0.01 to 1% by weight of one or more nitrogen-containing costabilizer and said nitrogen-containing costabilizer comprises melamine.

2. The polyoxymethylene as claimed in claim 1, wherein the amount of polyalkylene glycol is from 0.5 to 5% by weight.

3. The polyoxymethylene as claimed in claim 1, wherein the amount of zinc oxide is from 1 to 3% by weight.

4. The polyoxymethylene as claimed in claim 2, wherein the amount of zinc oxide is from 0.5 to 3% by weight.

5. The polyoxymethylene as claimed in claim 1, wherein the amount of nitrogen-containing costabilizer is from 0.03 to 0.3% by weight.

6. The polyoxymethylene as claimed in claim 2, wherein the amount of nitrogen-containing costabilizer is from 0.03 to 0.3% by weight.

7. The polyoxymethylene as claimed in claim 1, wherein test specimens in the form of ISO ¼ tensile specimens of thickness 1 mm produced from pellets obtained by melting and palletizing a mixture made from components A to D, which on each of five days in succession were fully immersed for 20 seconds in an aqueous solution made from 10% by weight of phosphoric acid and 1% by weight of an ionic surfactant, were then removed and, without wiping off any adhering acid/sufactant solution, aged freely suspended for 24 hours in an environment with controlled temperature and humidity, at 23° C. and relative humidity of about 30%, and then aged for further 9 days suspended in the environment with controlled temperature and humidity, show a relative weight difference of less than 15% compared with test specimens produced in the same way but not exposed to the acid/surfactant solution.

8. The polyoxymethylene as claimed in claim 7, wherein the relative change in weight of the test specimens made from components A to D is one third or less of the relative change in weight determined on test specimens made from 100% by weight of component A.

9. The polyoxymethylene as claimed in claim 1, wherein said polyalkylene glycol is polyethylene glycol.

10. The polyoxymethylene as claimed in claim 1, wherein said polyalkylene glycol is polypropylene glycol.

11. The polyoxymethylene as claimed in claim 1, wherein said at least one polyoxymethylene homo- or copolymer is a homopolymer of formaldehyde.

12. A molding made from the polyoxymethylene as claimed in claim 1 wherein the molding when in contact with aggressive acids or with aggressive acid-containing cleaning agents is resistive to said aggressive acids or said aggressive acid-containing cleaning agents.

13. The molding as claimed in claim 12, wherein the molding is used in the sanitary sector or the white goods sector.

14. A method for improving the acid resistance of the polyoxymethylene homo- or copolymer which comprises making the polyoxymethylene as claimed in claim 1, by mixing components A–D together to form a mixture and then melting said mixture.

15. A molding made from a polyoxymethylene composition comprising
   A from 84 to 99.79% by weight of at least one polyoxymethylene homo- or copolymer,
   B from 0.1 to 5% by weight of at least one polyalkylene glycol,
   C from 0.1 to 10% by weight of zinc oxide, and
   D from 0.01 to 1% by weight of one or more nitrogen-containing costabilizer wherein the molding when in contact with aggressive acids or with aggressive acid-containing cleaning agents is resistive to said aggressive acids or said aggressive acid-containing cleaning agents and said nitrogen-containing costabilizer comprises melamine.

16. The polyoxymethylene as claimed in claim 1, wherein nitrogen-containing costabilizer comprises a combination of melamine and at least one amino compound, amide compound, hydrazine compound, urea compound or a hindered amine.

17. The molding as claimed in claim 15, wherein nitrogen-containing costabilizer comprises a combination of melamine and at least one amino compound, amide compound, hydrazine compound, urea compound or a hindered amine.

* * * * *

UNITED STATES PATENT AND TRADEMARK OFFICE
CERTIFICATE OF CORRECTION

PATENT NO. : 7,247,665 B1
APPLICATION NO. : 10/088656
DATED : July 24, 2007
INVENTOR(S) : Carsten Woerner et al.

Page 1 of 1

It is certified that error appears in the above-identified patent and that said Letters Patent is hereby corrected as shown below:

In the Claims:

In Claim 11, in column 8 line 7, please insert -- or trioxane -- after "formaldehyde".

Signed and Sealed this

Eighteenth Day of December, 2007

JON W. DUDAS
*Director of the United States Patent and Trademark Office*